United States Patent [19]

Inayoshi et al.

[11] Patent Number: 5,494,695
[45] Date of Patent: Feb. 27, 1996

[54] CUSTARD CREAM

[75] Inventors: Kuniaki Inayoshi, Sennan; Sayoko Yabuuchi, Matsubara, both of Japan

[73] Assignee: Fuji Oil Company Limited, Osaka, Japan

[21] Appl. No.: 211,702

[22] PCT Filed: Aug. 16, 1993

[86] PCT No.: PCT/JP93/01147

§ 371 Date: Apr. 13, 1994

§ 102(e) Date: Apr. 13, 1994

[87] PCT Pub. No.: WO94/04044

PCT Pub. Date: Mar. 3, 1994

[30] Foreign Application Priority Data

Aug. 21, 1992 [JP] Japan .................... 4-245518

[51] Int. Cl.$^6$ .................. A23L 1/187; A23L 1/05; A23L 1/0522
[52] U.S. Cl. .................. 426/573; 426/579; 426/589; 426/602
[58] Field of Search ........................ 426/489, 578, 426/579, 573, 602

[56] References Cited

U.S. PATENT DOCUMENTS

| | | | |
|---|---|---|---|
| 5,167,975 | 12/1992 | Tsurumaki et al. | 426/578 |
| 5,338,560 | 8/1994 | Wesdorp et al. | 426/578 |
| 5,360,625 | 11/1994 | Sikking et al. | 426/578 |

FOREIGN PATENT DOCUMENTS

| | | |
|---|---|---|
| 2-31647 | 2/1990 | Japan . |
| 4-131060 | 5/1992 | Japan . |
| 5-30911 | 2/1993 | Japan . |

*Primary Examiner*—Jeanette Hunter
*Attorney, Agent, or Firm*—Wenderoth, Lind & Ponack

[57] ABSTRACT

There is provided a custard cream, a body of which is formed by utilizing crystallizability of a SUS type oil-and-fat (utilizing a plastic state "thickened state" of an oil-in-water emulsion composition). This custard cream has very good melting properties in the mouth and smooth texture, in which no polysaccharides such as starch, gelatinizing agent and the like are necessary and which utilizes crystallizability of an oil-and-fat without forming a body by foaming force as in the case of a whipped cream.

7 Claims, No Drawings

CUSTARD CREAM

TECHNICAL FIELD

The present invention relates to a custard cream, a body (solidified shape) of which is formed by utilizing crystallizability of an oil-and-fat containing not less than 70% of SUS type triglycerides. Therefore, according to the present invention, there can be provided a high grade custard cream using no starch and having good melting properties in the mouth and smooth texture.

PRIOR ART

A body of a custard cream is generally composed of polysaccharides such as starch (soft flour), gelatinizing agent and the like and therefore the custard cream has such defects as sticky and rough mouth feel and very inferior melting properties in the mouth. In addition, although a foamable oil-in-water emulsion, that is, a foamable custard cream, a body of which is formed by adding ingredients such as yolk, milk and the like to a whipped cream and whipping them has been provided since a few years ago, it has persistently the same properties as those of the conventional whipped cream, is of weak taste and poor body due to the relationship with over-run and has no resistance to heat.

On the other hand, there has never been known previously a custard cream, a body of which is formed by utilizing crystallizability of an oil-and-fat.

OBJECTS OF THE INVENTION

The object of the present invention is to obtain a custard cream-like foodstuff having good melting properties in the mouth and smooth texture by utilizing crystallizability of an oil-and-fat without using polysaccharides such as starch (soft flour), gelatinizing agent and the like and without forming a body utilizing foaming force as in the case of a whipped cream.

DISCLOSURE OF THE INVENTION

In order to attain the above object, the present inventors studied intensively and, as the result, we found that a custard cream in which no polysaccharides such as starch, gelatinizing agent and the like are used as a body forming agent can be obtained by utilizing crystallizability of an oil-and-fat rich in SUS type triglycerides. And this custard cream of an oil-and-fat body is a novel custard cream having much better melting properties in the mouth and extremely smooth texture different from those of a custard cream of a starch body, including a custard cream-like foodstuff and custard-flavored cream. The present invention is explained in detail below.

Since an oil-and-fat rich in SUS type triglycerides has inherently such the properties that stability of emulsificated state is extremely low and thickened state (plastic state) is easy to be caused, it has been said to be unsuitable for preparing an oil-in-water emulsion composition. Thus, the present inventors paid attention to this thickened state and, by using daringly thickened state which is thought to be defects, we succeeded in obtaining a custard cream which utilizes crystallizability without using polysaccharides such as starch, gelatinizing agent and the like.

That is, the present invention relates to a custard cream which comprises utilizing crystallizability of an oil-and-fat containing not less than 70% (referred to as weight % hereinafter) of SUS type triglycerides and having not less than 70% of SFC at 5° C. and not less than 55% of SFC at 15° C. More preferably, the present invention relates to a custard cream wherein the number of carbon atoms of fatty acid residue in a 1,3-disaturated triglyceride of the SUS type triglyceride is 16 and/or 18.

Examples of the oil-and-fat rich in SUS triglycerides are palm oil, illipe butter and shea butter, and hardened or fractionated oil-and-fat thereof, and interesterificated butter obtained by introducing a saturated fatty acid in 1,3-positions of an oil-and-fat rich in unsaturated fatty acids at 2-position. The SUS type triglyceride refers to a 2-unsaturated-1,3-disaturated triglyceride, and the number of carbon atoms of fatty acid residue therein is 8 to 22 (small amount of short chain fatty acid may be contained therein), 16 and/or 18 being most preferable. Examples of the 2-positional unsaturated fatty acid are oleic acid, linoleic acid, linolenic acid and the like.

In addition, although small amount of other kind of oil-and-fat raw material may be added to the oil-and-fat rich in SUS type triglycerides, the proportion to be added is up to 10% and, when the proportion exceeds 10%, there may be the cases where a thickened state, that is, plastic state becomes incomplete due to ununiform crystallizability of an oil-and-fat or it takes longer time to reach a plastic state. In order to give more sharp melting properties, formulation is performed so that SFC of an oil-and-fat as a whole is not less than 70% at 5 ° C. and not less than 55% at 15° C. The content of an oil-and-fat in the custard cream of the present invention is not more than 50%, preferable, 15 to 35% based on the total weight of the cream. When the oil-and-fat is used in an amount of less than 15%, a plastic state is incomplete and, when used in an amount of more than 50%, a good taste custard cream can not be obtained due to strongly oily feeling.

Yolk is added mainly for giving custard flavor, but since gel properties of yolk have also more or less relationship with body properties as a custard cream, yolk is essential to a custard cream. Usually, in the present invention, commercially available liquid yolk may be used or a fresh egg may be broken to take only yolk, and an amount of yolk to be added may be optionally selected depending upon one's liking for custard flavor, 3 to 20% being preferable. However, when sterilizing treatment such as ultra-high temperature pasteurization is carried out upon preparation of the present custard cream, there is such a problem that scorching occurs in a heat exchanger of a sterilizing apparatus in the case where the content of yolk is too high. Therefore, in such the case, pre-modified yolk such as lyophilized yolk, sweetening and heating-modified yolk, enzyme-treated yolk and the like may be used.

Solids-not-fat are necessary to stabilize an emulsificated state of an oil-in-water emulsion in addition to impart milk flavor to a custard cream. Examples of solids-not-fat are skim milk powder, whole milk powder, raw cream, sweetened condensed milk and the like. Alternatively, skim milk powder or whole milk powder may be Maillard-treated. Such the solids-not-fat are used in an amount of 1 to 15%, preferably, 3 to 10% based on the total weight. Sugars are essential for imparting flavor as a sweetener for a custard cream. Examples of sugars are sucrose, glucose, sorbitol, saccharificated reduced starch, maltose, lactose, fructose, various thick malt syrups and the like. These sugars are added in an amount of 5 to 30%, preferably, 15 to 25% based on the total weight of the custard cream in order to serve as a sweetener, different from a body former such as starch, gelatinizing agent, viscosity-increasing polysaccharides and the like. Although the cascade cream of the present invention can be prepared using no polysaccharides such as starch, gelatinizing agent and the like, these polysaccharides may be added thereto in some quantity in order to prevent water from leaving and maintain the stability of texture.

In the custard cream of the present invention, it is preferable that various salts or emulsifiers are used. For salts, it is desirable that sodium hexametaphosphate, sodium secondary phosphate, sodium citrate, sodium polyphosphate, sodium bicarbonate and the like are used sole or as the mixture of not less than two of them. Any emulsifiers may be used in so far as they are generally used for preparing an oil-in-water emulsion. Especially, sucrose fatty acid ester, sorbitan fatty acid ester, lecithin, propylene glycol fatty acid ester, glycerin fatty acid ester and polyglycerin fatty acid ester may be suitably mixed to used, wherein the total of them are added to an oily phase or aqueous phase in the proportion of 0.1 to 1% by weight based on the total weight of an emulsion.

The custard cream of the present invention can be prepared according to the steps for preparing a field cream or imitation cream, and one example of preparation is explained below. Respective raw materials are pre-emulsified at 70° C. for 20 minutes and homogenized under the conditions of 0 to 150 kg/cm$^2$. The homogenate was then treated by ultra-high temperature heating (UHT), homogenated again under the conditions of 0 to 150 kg/cm$^2$, cooled and subjected to aging for about 48 hours. Aging time is longer in the case of the present custard cream than in the case of the conventional field cream because the present custard cream utilizes crystallizability of an oil-and-fat and it takes longer time to reach the so-called thickened state, that is, plastic state comparing with the case of the conventional field cream.

The custard cream of the present invention can be used for preparing cream puffs, filling in breads, cakes and the like, icing and preparing imitation flowers.

In the present invention, a body of a custard cream is formed by using an oil-and-fat rich in SUS type triglycerides and utilizing crystallizability of the oil-and-fat and the phenomenon upon formation of a body is thought to be as follows. Inherently, an oil-and-fat rich in SUS type triglycerides is used mainly as a vegetable oil-and-fat for chocolates, that is, as a hard butter, and crystal pattern of the oil-and-fat is generally confirmed to include six patterns of types 1 to 6. Among these types, stable state of type 5 is maintained in the present custard cream.

Respective custard creams obtained in the following Examples 1 and 2 were studied on crystal pattern by X-ray diffraction method using a MXP-3 apparatus manufactured by MACSCIENCE Company, and it was found that crystal pattern of both samples is type 5 ($\beta_2$ type) and respective custard creams have very stable crystal structure. These samples were cooled and stored for ten days in a refrigerator and crystal pattern was studied according to the same method. As the result, respective samples were found to maintain stable state of 5 type and have good physical properties without change in physical properties such as water leaving, oil off and the like.

The following Examples illustrate the embodiments of the present invention, but they are merely illustrative and the spirit of the present invention is not limited to them. In addition, part and % are represented by weight.

EXAMPLE 1

An oily phase for a custard cream (table 1) was prepared by warming an oil-and-fat to 70° C. and adding lecithin thereto to mix. On the other hand, an aqueous phase was prepared by warming water to about 60° C., adding sodium hexametaphosphate thereto to dissolve, then dissolving or dispersing therein whole powder, yolk and sucrose. Then, the oily phase and aqueous phase were mixed and, if necessary, sucrose fatty acid ester and perfume were added thereto, the mixture was stirred to pre-emulsify at 65° to 70° C. for 20 minutes using a honomixer and homogenized under the conditions of 30 kg/cm$^2$. Thereafter, the homogenate was immediately treated at 140° to 145° C. for four seconds by UHT direct heat-sterilizing, homogenated again under the conditions of 40 kg/cm$^2$, cooled rapidly to about 10° C. and filled in a corrugated cardboard box where vinyl chloride bag had been laid. The filled homogenate had the viscosity of 250 cps and showed a liquid state.

This filled substances were subjected to aging in a refrigerator at 5° C. for about 48 hours to obtain a custard cream showing a plastic state. The viscosity at that time was not measurable due to a plastic state and hardness was 150 g/cm$^2$ by a rheometer (using a 10 $\phi$ plunger). A custard cream of the present invention is an oil-in-water emulsion having very good melting properties in the mouth and smooth texture, where any polysaccharides such as starch and gelatinizing agent are not used at all as shown in formulation in Table and a body is formed only by means of crystallizability of an oil-and-fat.

EXAMPLE 2 TO 3

Custard creams were prepared according to the same formulation and manners as those in Example 1 except that an oil-and-fat was varied and the composition of an oil-and-fat was different. As the result, custard creams were obtained which showed a plastic state of rheometer value of 120 g/cm$^2$ in the formulation of Example 2 (Table 1) and of rheometer value of 90 g/cm$^2$ in the formulation of Example 3 (Table 1). Although these custard creams did not have the equal level of hardness comparing with that in Example 1, they showed a plastic state and therefore had a softer body derived from crystallizability of an oil-and-fat. In addition, all samples of Example 1 to 3 showed no change in hardness even after ten days and had good physical properties without water leaving and oil off.

TABLE 1

Formulation of custard cream (values represent weight % in total weight)

| Raw material | | Example 1 | Example 2 | Example 3 |
|---|---|---|---|---|
| Oil-and-fat A | (note 1) | 23.6 | — | — |
| Oil-and-fat B | (note 2) | — | 23.6 | — |
| Oil-and-fat C | (note 3) | — | — | 23.6 |
| Yolk | (note 4) | 15.0 | 15.0 | 15.0 |
| Sucrose | | 10.0 | 10.0 | 10.0 |
| Whole milk powder | | 8.5 | 8.5 | 8.5 |
| Water | | remainder | remainder | remainder |
| Emulsifier | (note 5) | 0.4 | 0.4 | 0.4 |
| Salts | (note 6) | 0.19 | 0.19 | 0.19 |
| Perfume | | 0.06 | 0.06 | 0.06 |

| | Melting point | SFC (5° C.) | SFC (15° C.) | Content of SUS type triglycerides in oil-and-fat |
|---|---|---|---|---|
| Oil-and-fat A | 30° C. | 90% | 80% | 80% |
| Oil-and-fat B | 33° C. | 85% | 70% | 80% |
| Oil-and-fat C | 39° C. | 90% | 80% | 83% |

(Note 1, 2, 3)
Oil-and-fat A: Middle-melting portions of palm oil
Oil-and-fat B: Middle-melting portions of palm oil, cocoa butter substitute comprising fractionated shea butter
Oil-and-fat C: Fractionated shea-butter
(Note 4) Freezing-modified yolk (modified proportion: 45%)
(Note 5) Soy bean lecithin and sucrose fatty acid ester
(Note 6) Sodium hexamataphosphate, sodium bicarbonate, sodium citrate

COMPARATIVE EXAMPLES 1 TO 3

Samples were obtained according to the same formulation and manners as those in Example 1 to 3 except that an oil-and-fat was varied and the composition of an oil-and-fat was different. As the result, even at 72 hours after aging, the filled substances remained a liquid having approximately the same viscosity as that immediately after filling, and a plastic state was not attained, resulting in no custard creams.

From these facts, it is clear that an oil-and-fat to be used should essentially contain not less than 70% of SUS type triglycerides and have SFC of not less than 70% at 5° C. and not less than 55% at 15° C. That is, selection of an oil-and-fat is important in the present custard cream, a body of which is formed by utilizing crystallizability of the oil-and-fat.

TABLE 2

Formulation of custard cream (values represent weight % in total weight)

| Raw material | Comparative Example 1 | Comparative Example 2 | Comparative Example 3 |
|---|---|---|---|
| Oil-and-fat T (note 1) | 23.6 | — | — |
| Oil-and-fat U (note 2) | — | 23.6 | — |
| Oil-and-fat V (note 3) | — | — | 23.6 |
| Yolk | 15.0 | 15.0 | 15.0 |
| Sucrose | 10.0 | 10.0 | 10.0 |
| Whole milk powder | 8.5 | 8.5 | 8.5 |
| Water | remainder | remainder | remainder |
| Emulsifier | 0.4 | 0.4 | 0.4 |
| Salts | 0.19 | 0.19 | 0.19 |
| Perfume | 0.06 | 0.06 | 0.06 |

TABLE 2-continued

Formulation of custard cream (values represent weight % in total weight)

| | Melting point | SFC (5° C.) | SFC (15° C.) | Content of SUS type triglycerides in oil-and-fat |
|---|---|---|---|---|
| Oil-and-fat T | 36° C. | 90% | 85% | not more than 50% |
| Oil-and-fat U | 26° C. | 65% | 53% | 65% |
| Oil-and-fat V | 31° C. | 55% | 40% | not more than 50% |

(Note 1, 2, 3)
Oil-and-fat T: Isomerized hardened palm oil
Oil-and-fat U: Middle-melting portions of palm oil
Oil-and-fat V: Hardened rapeseed-palm mixed oil

EXAMPLE 4 AND COMPARATIVE EXAMPLE 4

Samples were prepared according to the same formulation and manners as those in Examples 1 to 3 except that an oil-and-fat was varied and the composition of an oil-and-fat was different (Table 3). Experiments were carried out on an oil-and-fat rich in SUS type triglycerides obtained by mixing other oil-and-fat, that is, hardened coconut oil in middle-melting portions of palm oil at different mixing rate. As the result, a sample of Example 4 in the case of a mixed oil-and-fat containing an oil-and-fat other than triglyceride at 10% gave a custard cream showing a plastic state of rheometer value of 70 g/cm$^2$, while a sample of Comparative Example 4 in the case of a mixed oil-and-fat containing an oil-and-fat other than triglyceride at 15% gave a liquid having approximately the same viscosity as that immediately after filling and a custard cream showing a plastic state was not obtained.

TABLE 3

Formulation of custard cream (values represent weight % in total weight).

| Raw material | Example 4 | Comparative Example 4 |
|---|---|---|
| Oil-and-fat W (note 1) | 23.6 | — |
| Oil-and-fat X (note 2) | — | 23.6 |
| Yolk | 15.0 | 15.0 |
| Sucrose | 10.0 | 10.0 |
| Whole milk powder | 8.5 | 8.5 |
| Water | remainder | remainder |
| Emulsifier | 0.4 | 0.4 |
| Salts | 0.19 | 0.19 |
| Perfume | 0.06 | 0.06 |

| | Melting point | SFC (5° C.) | SFC (15° C.) | Content of SUS type triglycerides in oil-and-fat |
|---|---|---|---|---|
| Oil-and-fat W | 29° C. | 85% | 75% | 70% |
| Oil-and-fat X | 28° C. | 78% | 69% | 66% |

(Note 1, 2)
Oil-and-fat W: Middle-melting portions of palm oil 90% + hardened coconut oil 10%
Oil-and-fat X: Middle-melting portions of palm oil 85% + hardened coconut oil 15%

From this Comparative Example, it was thought that, when other oil-and-fat raw material is added to an oil-and-fat rich in SUS type triglycerides, the upper limit of the proportion to be added is 10% and, when added in an amount above 10%, a plastic state becomes incomplete due to ununiformization and inhibition of crystallization of an oil-and-fat.

As explained above, according to the present invention, there can be provided a custard cream having very good melting properties in the mouth and smooth texture by utilizing crystallizability of an oil-and-fat without using polysaccharides such as starch, gelatinizing agent and the like and without forming a body by foaming force as in the case of whipped cream.

What is claimed is:

1. A custard cream which is an oil-in-water emulsion having a thickened plastic state, comprising 15 to 50% of oil, 20 to 70% water, 3 to 20% yolk and 1 to 15% of solids-not-fat, wherein the oil comprises not less than 70% of SUS type triglycerides and has SFC of not less than 70% at 5° C. and not less and 55% at 15° C.

2. The custard cream according to claim 1, wherein the number of carbon atoms of fatty acid in a 1,3-disaturated triglyceride of a SUS type triglyceride is 16 and/or 18.

3. A process for producing the custard cream of claim 1 which comprises formulating an oil-in-water emulsion containing as a main ingredient 15 to 50% of oil, 20 to 70% of water, 3 to 20% of yolk and 1 to 15% of solids-not-fat.

4. The process for producing a custard cream of claim 3, wherein the custard cream contains 5 to 30% of sugars and 0 to 5% of starch as an ingredient.

5. A process for producing the custard cream of claim 2 which comprises formulating an oil-in-water emulsion containing as a main ingredient 15 to 50% of oil, 20 to 70% of water, 3 to 20% of yolk and 1 to 15% of solids-not-fat.

6. The process for producing a custard cream of claim 5, wherein the custard cream contains 5 to 30% of sugars and 0 to 5% of starch as an ingredient.

7. In a custard cream which is an oil-in-water emulsion which includes a thickening agent to provide a thickened plastic state, the improvement wherein the thickening agent is oil which contains not less than 70% of SUS type triglycerides and has SFC of not less than 70% at 5° C. and not less than 55% at 15° C.

* * * * *